United States Patent Office 3,647,717
Patented Mar. 7, 1972

3,647,717
PROCESS FOR IMPROVING THE ACTIVITY OF
ZEOLITIC CATALYST COMPOSITIONS
Anthony Peter Bolton, Valley Cottage, N.Y., assignor to
Union Carbide Corporation, New York, N.Y.
No Drawing. Filed Aug. 26, 1970, Ser. No. 67,222
Int. Cl. B01j 11/40
U.S. Cl. 252—455 Z
6 Claims

ABSTRACT OF THE DISCLOSURE

The catalytic activity of catalyst compositions comprising a zeolitic aluminosilicate in conjunction with a Group VIII noble metal oxide hydrogenation promoter are improved by converting the noble metal to its corresponding sulfide form, the sulfide to the corresponding hydroxide, the hydroxide to the corresponding noble metal ammine complex and thereafter decomposing the ammine complex in an oxidizing atmosphere followed by an activation by reduction in hydrogen.

---

The present invention relates in general to the improvement of zeolite catalyst compositions and more particularly to a process for improving the activity of noble metal-zeolite dual function catalyst such as are used in hydrocarbon conversion processes.

In several of the well-known hydrocarbon conversion processes such as hydrocracking, reforming, hydroisomerization, hydrotreating and hydrodealkylation crystalline zeolitic molecular sieves are employed in conjunction with a finely dispersed noble metal of Group VIII of the Periodic Table as the catalyst composition. When the catalyst composition is prepared initially, the noble metal is dispersed on the zeolite surface by any of a variety of well known techniques, the two principal methods being by ion exchange of the noble metal into the zeolite structure and subsequent reduction to elemental metal and by simple impregnation wherein a compound of the noble metal is deposited on the surface of the zeolite from solution and the compound ultimately reduced to elemental. In both techniques the reduction step is sometimes accomplished in situ in a catalyst bed by virtue of the reducing nature of the feed composition. The function of the noble metal is considered to be primarily that of an hydrogenation catalyst and, at least in this role, the activity of the catalyst prepared by the ion exchange technique is observably superior, perhaps due in part to a greater degree of dispersion of the metal particles.

In use, the catalyst compositions, regardless of the method of their preparation, slowly accumulate a deposit of a carbonaceous coke and undergo a gradual decline in catalytic activity assuming constant temperature conditions. It is conventional practice to increase the operating temperature in relatively small increments to compensate for the decreasing activity of the catalyst and this procedure is acceptable until such time as the composition of the conversion product is undesirable for its intended purpose or for other considerations such as economics.

Many theories have been advanced to account for the aforesaid decline in catalytic activity, though none has been proven conclusively. It has been proposed, for example, that the dispersed noble metal which ideally approaches a monoatomic state of subdivision becomes agglomerated into much larger particles with a resultant loss of effective surface area. It has also been theorized that the internal cavities within the crystal structure of the zeolite provide a favorable or protective environment for the noble metal constituent which inhibits the poisoning or inactivation of the metal surface. Dislocation of the metal particles from their favored position during use of the catalyst could then result in a rapid deterioration of hydrogenation activity.

Several methods have been proposed for oxidatively regenerating the coked catalyst. Essentially these methods comprise burning the carbonaceous coke from the zeolite using low controlled amounts of oxygen to avoid the development of destructively high temperatures (with respect to the zeolite). Precautions are also taken to avoid the creation of too high a concentration of water which otherwise would tend to effect noble metal agglomeration and deteriorate the crystal structure by hydrolysis. A particularly effective oxidative regeneration procedure for coke molecular sieve bodies is set forth in U.S. Pat. 3,069,362 issued Dec. 18, 1962 to R. L. Mays, et al.

If a procedure such as the Mays, et al. process is carefully executed, it is frequently found that a noble metal loaded zeolite catalyst coked during service in a hydrocracking process is regenerated essentially completely as evidenced by its hydrocracking activity with respect to a sweet and/or nitrogen-containing petroleum feedstock. This is true despite the fact that agglomerates of the noble metal persist in the regenerated catalyst which are clearly visible using an electron microscope. It is surprisingly found however that if the regenerated catalyst composition is evaluated using a sour feedstock, the degree of restoration is apparently much less complete. A possible explanation of this phenomenon is that the presence of agglomerated noble metal on the regenerated catalyst significantly reduces the effective concentration of the hydrogenation component and that under sour conditions this concentration is further reduced by conversion to noble metal sulphide. That no difference in activity between fresh and regenerated catalyst activity is observed with feedstock containing both nitrogen and sulphur compounds is attributed to the nitrogen compounds reducing the cracking activity of the zeolite which would result in a decreased hydrogenation requirement.

In view of the foregoing, it is the general object of the present invention to provide a method for improving the catalytic activity of a dispersed Group VIII, noble metalzeolitic molecular sieve composite catalyst regardless of whether the lack of full activity is due to inadequate dispersion or improper deposition of the noble metal during preparation of the catalyst or deterioration during normal use in a hydrocarbon conversion process. Other objects will be apparent from the specification appearing hereinafter.

In accordance with the present invention, the process comprises contacting a crystalline zeolitic molecular sieve catalyst composition carrying in a dispersed state a hydrogenation component comprised of a Group VIII noble metal as a metal oxide, said catalyst composition being substantially free of carbonaceous coke deposits, with a sulfiding agent to convert at least a portion of the noble metal value to the corresponding noble metal sulfide, then containing the catalyst composition with water vapor at elevated temperature to convert at least a portion of the noble metal sulfide to the noble metal hydroxide, sometimes referred to as noble metal oxide hydrate, thereafter contacting the catalyst composition with an ammoniating agent to convert at least a portion of the noble metal hydroxide to the corresponding noble metal ammine complex and finally reducing the ammine complex to form elemental Group VIII noble metal.

The crystalline zeolite portion of the catalyst composition can be any of the synthetic or natural occurring crystalline zeolites well known in the art as adsorbents and/or catalyst bases. Preferably, the zeolite has a pore diameter sufficiently large to pass therethrough the cation $Pd(NH_3)_4^{+2}$ and it is especially preferred that the zeolite have a silica to alumina molar ratio of greater than 3 and/or a pore size large enough to adsorb benzene. Illustrative of this most preferred class of zeolites are zeolite, Y, U.S. Pat. 3,130,007; zeolite L, U.S. Pat. 3,216,789; zeolite X, U.S. Pat. 2,882,244; zeolite Omega, British Patent No. 1,178,186; faujasite the "open port" species of synthetic mordenite disclosed in U.S. Pat. 3,436,174 and acid extracted natural and synthetic mordenites which by virtue of the acid treament are benzene adsorbing. Other suitable zeolites include zeolite T, U.S. Pat. 2,950,952; zeolite A, U.S. Pat. 2,882,243; zeolite S, U.S. Pat. 3,054,657; zeolite R, U.S. Pat. 3,030,181, and the naturally occurring minerals gmelinite, offretite, erionite, chabazite, clinoptilolite and philipsite. The cation species present in the aforesaid zeolites to balance the electrovalence of the $AlO_4^-$ tetrahedra is not a critical factor insofar as the present invention is concerned. However, it will most generally be the case that the zeolitic cations such as sodium and/or potassium normally present in the zeolites when originally formed will be ion exchanged with polyvalent metal cations and/or hydrogen or hydrogen precursors such as ammonium cations. These exchanged cations either improved the properties of the zeolite by virtue of their own presence or they replace the alkali metal cations which usually have an adverse effect on the hydrocarbon conversion process. Polyvalent metal cations which are commonly present in the catalysts being treated according to the present invention include manganese, magnesium, calcium, zinc, rare earth metals, e.g. cerium and chromium.

The Group VIII noble metals referred to in the specifications and claims are those of the second and third triads or Group VIII of the Periodic Table of the elements and consist of platinum, palladium, rhodium, iridium, osmium and ruthenium.

Prior to the step in which the noble metal, or noble metal oxide is converted to its sulfide, any carbonaceous coke present on the catalysts should be removed. In general the carbonaceous portions of coke deposits do not interfere chemically with the sulfiding reaction but acts rather as an impediment to the catalyst use process. In some instances, however, certain sulfur compounds are present in the coke deposit initially and react with the noble metal to form metallo-sulfur compounds other than sulfides which are not amenable to being converted to noble metal hydroxides in the water treatment step of the present process. Accordingly the removal of the coke deposit by oxidative means not only avoids further problems with the coke but also ensures that substantially all of the noble metal constituent of the catalyst composition is in the form of the oxide. Of course, where it is desired only to attain a higher degree of dispersion of noble metal oxide on a newly prepared or non-coked catalyst, oxidative treatment is unnecessary.

Sulfiding is done by contacting the catalyst with hydrogen sulfide gas at moderated temperature preferably in a flowing system. This permits any water formed due to oxide or hydroxide on the metal to be swept away. The hydrogen sulfide may be diluted in an inert or reducing gas such as nitrogen or hydrogen and may be used as dilute as one percent. The temperature of this sulfiding treatment may range from about 25° to 200° C. Temperatures above 200° C. are undesirable in that the sulfided metal is believed to become more resistant to the following hydrolysis treatment at temperatures about 200° C. resulting in less of the noble metal being subsequently redispersed. All of the steps are conducted at temperatures not exceeding 200° C. for this reason. The quantity of $H_2S$ used is not a critical factor since the catalyst will be improved even if only a fraction of the noble metal is redispersed by the present treatment. Advantageously, however, the amount of $H_2S$ employed should be at least a stoichiometric quantity based on the noble metal available for reaction with the $H_2S$.

The water treatment subsequent of the sulfiding treatment is done under similar conditions. Water vapor is passed over the sulfided catalyst at temperatures not exceeding 200° C. to convert the noble metal sulfide to the hydroxide. The water vapor can be carried in a diluent gas that is inert, reducing or oxidizing. Air is an excellent carrier gas as is nitrogen or hydrogen. The water content of the heating gas can range from trace amounts to 100 volume percent, but is preferably from about 1 to about 10 volume percent. As was the case with the sulfiding reaction, the amount of water used is not critical but should be sufficient to convert all of the noble metal sulfide to the corresponding hydroxide.

Following the water treatment, the catalyst is contacted with ammonia at a temperature of from about 25° C. to about 200° C. either by passing the ammonia over the catalyst particles or letting the particles stand in an ammonia-containing atmosphere. The ammoniation of the hydrolyzed noble metal is believed to form the ammine complex of the positively charged atoms of the noble metal forming mobile cations which disperse on the anionic framework of the zeolite molecular sieve. The ammonia gas may be diluted with inert gas such as nitrogen or hydrogen as desired. The carrier gas need not be specially dried since the complexing power of ammonia with the noble metal cations is far stronger than the hydrolyzing power of water. The ammonia content of the contacting gas may range from trace to 100 percent, but is preferably from about 1 to about 10 volume percent. The total quantity of $NH_3$ employed is not critical, but should be sufficient to convert all of the noble metal hydroxide to the corresponding amine complex.

It is to be understood that whereas the sulfide, water and ammonia treating steps have been described herein above as being sequential, the sequence is essential only with respect to the chemical reaction undergone by the noble metal and not with respect to the order in which the reagents contact the overall catalyst mass. Thus, it is possible to combine $H_2S$ and $H_2O$ in a single treatment fluid, and $H_2O$ and $NH_3$ can be combined or the $H_2S$ employed separately.

Following ammoniation, the catalyst is in condition for activation the same as is well known for noble metal loaded catalysts prepared originally by the ion-exchange technique with the ammine complex cations of the noble metals. Ordinarily, this comprises heating at temperatures from 350° C. to 700° C., the catalyst composition in an oxidizing atmosphere, e.g. air. This is followed by an activation step in a reducing atmosphere, e.g. $H_2$ between 200° and 600° C. to result in the formation of elemental noble metals in a highly dispersed state. The final reduction step can be carried out in situ.

The efficacy of the process of this invention is demonstrated using a hydrocracking catalyst which had previously been in service in a hydrocracking unit for about three years. The catalyst was initially prepared by ammonium cation exchanging a sodium zeolite Y having a $SiO_2/Al_2O_3$ molar ratio of 4.8 to a degree of about 85 equivalent percent. Thereafter, the zeolite was back exchanged with 40 equivalent percent magnesium cations and then loaded with 0.5 wt. percent palladium by the ion exchange technique using $Pd(NH_3)_4Cl_2$. The zeolite was tableted with 20 weight percent alumina and fired 520° C. for ¾ hour. The catalyst was tested in this as-prepared condition using a gas oil feedstock boiling in the range of 400 to 850° F. containing about 74 volume percent saturated hydrocarbons and about 26 volume percent aromatic hydrocarbons. After 150 hours on stream, it was found that the catalyst was capable of accomplishing a 55% conversion to below 400° F. product at a temperature 525° F. When the feedstock was made sour by the addition thereto of 0.5 wt. percent $H_2S$ the catalyst required operation at 55° F. to attain the same 55% conversion.

The same catalyst after being coked during the three year service in a commercial unit was oxidatively regenerated without loss of crystallinity and was found to have the same degree of catalytic activity with respect to the same feedstock after a 150 hour period on stream. With respect to the aforesaid sour feedstock, however, the catalyst required a temperature of 618° F., thus indicating that the oxidative regeneration had not fully restored the activity of the catalyst.

Two samples of the same oxidatively regenerated catalyst material tested as described above were treated according to the process of the present invention. The catalyst samples were placed in fixed beds and a stream of $H_2S$ was passed through the beds at 200° F. for 60 minutes. Next water vapor at 350° F. was passed through one bed and through the other bed at 100° F. for 60 minutes followed by an ammonia gas stream through each bed at 100° F. The ammonia treatment lasted for about 90 minutes. Both samples were then dried and calcined at 520° C. for 2 hours in air. Using the same sour feedstock as in previous tests, the catalyst samples were tested for catalytic activity using 1450 p.s.i. pressure, liquid hourly space velocity of 1.7 and a $H_2$ flow rate of 8000 s.c.f./bbl. The results are shown below.

| Catalyst | Temperature, ° F. | | | |
|---|---|---|---|---|
| | $H_2S$ treatment | $H_2O$ treatment | $NH_3$ treatment | Required for 55 percent conv. at 100 hrs. |
| Oxidatively regenerated | | | | 618 |
| Sample: | | | | |
| 1. This process | 100 | 350 | 100 | 556 |
| 2. This process | 100 | 100 | 100 | 560 |

It is readily seen that substantially all of the activity of the catalyst had been restored even with respect to sour feedstocks by the process of this invention.

What is claimed is:

1. Process for improving the activity of a catalyst which comprises providing a catalyst composition comprising a crystalline zeolitic molecular sieve and a Group VIII noble metal oxide, contacting said composition with hydrogen sulfide, water and ammonia at temperature below about 200° C. in amounts sufficient to convert at least some of the Group VIII metal oxide sequentially to its sulfide, hydroxide and noble metal ammine complex, calcining the composition thus formed in an oxidizing atmosphere to decompose said ammine complex and thereafter contacting the composition with hydrogen to form elemental noble metal.

2. Process according to claim 1 wherein the Group VIII noble metal is present in an amount of from about 0.01 to 1.5 weight percent.

3. Process according to claim 1 wherein the crystalline zeolitic molecular sieve has a pore diameter large enough to adsorb benzene.

4. Process according to claim 2 wherein the crystalline zeolitic molecular sieve has a silica to alumina molar ratio of greater than 3.

5. Process according to claim 4 wherein the noble metal is palladium.

6. Process according to claim 5 wherein the zeolitic molecular sieve is zeolite Y having a silica to alumina molar ratio of at least 4.6 less than about 15 equivalent percent alkali metal cations, having about 40 equivalent percent magnesium cations, and the palladium is present in an amount of about 0.05 weight percent.

References Cited

UNITED STATES PATENTS

| | | | |
|---|---|---|---|
| 3,135,699 | 6/1964 | Herzog et al. | 252—412 |
| 3,140,264 | 7/1964 | Oleck et al. | 252—412 |
| 3,197,397 | 7/1965 | Wight et al. | 252—416 X |
| 3,200,082 | 8/1965 | Breck et al. | 252—455 |
| 3,287,257 | 11/1966 | Hansford et al. | 252—416 X |
| 3,357,915 | 12/1967 | Young | 252—416 X |
| 3,450,644 | 6/1969 | Lanewala et al. | 252—416 |

DANIEL E. WYMAN, Primary Examiner

C. F. DEES, Assistant Examiner

U.S. Cl. X.R.

252—460